United States Patent
Liang et al.

(10) Patent No.: US 12,225,544 B2
(45) Date of Patent: Feb. 11, 2025

(54) INFORMATION DETERMINATION METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventors: Bin Liang, Dongguan (CN); Jing Xu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 379 days.

(21) Appl. No.: 17/832,398

(22) Filed: Jun. 3, 2022

(65) Prior Publication Data
US 2022/0295535 A1 Sep. 15, 2022

Related U.S. Application Data

(63) Continuation of application No. PCT/CN2020/075080, filed on Feb. 13, 2020.

(51) Int. Cl.
*H04W 72/23* (2023.01)
*H04L 5/00* (2006.01)

(52) U.S. Cl.
CPC .......... *H04W 72/23* (2023.01); *H04L 5/0048* (2013.01)

(58) Field of Classification Search
CPC ................................. H04W 72/23
See application file for complete search history.

(56) References Cited

U.S. PATENT DOCUMENTS

| 2021/0044467 A1* | 2/2021 | Xi | H04L 5/0007 |
| 2022/0330254 A1* | 10/2022 | Gao | H04W 72/23 |
| 2023/0007680 A1* | 1/2023 | Aiba | H04L 5/0092 |

FOREIGN PATENT DOCUMENTS

| CN | 103795513 A | 5/2014 |
| CN | 102447524 B | 4/2015 |
| CN | 108737040 A | 11/2018 |
| CN | 109983730 A | 7/2019 |
| CN | 110266459 A | 9/2019 |
| CN | 110351037 A | 10/2019 |
| CN | 110431818 A | 11/2019 |

OTHER PUBLICATIONS

First Office Action from corresponding Chinese Application No. 202210542001.3, dated May 16, 2023. English translation attached.
(Continued)

*Primary Examiner* — Abdeltif Ajid
(74) *Attorney, Agent, or Firm* — Sheppard, Mullin, Richter & Hampton LLP

(57) ABSTRACT

The present disclosure provides an information determination method and apparatus, a device, and a storage medium, which relate to the field of mobile communications. The method includes: determining, when no antenna port field exists in a format of first Downlink Control Information (DCI), a first Demodulation Reference Signal (DMRS) port used for transmission scheduled by the first DCI, and/or a first antenna port used for transmission scheduled by the first DCI.

11 Claims, 7 Drawing Sheets

(56) References Cited

OTHER PUBLICATIONS

Grant Notice & Supplementary Search from corresponding Chinese Application No. 202210542001.3, dated Jul. 13, 2023. English translation attached.
Communication under Rule 71(3) EPC dated Jul. 5, 2023 received in European Patent Application No. EP20918297.1.
Extended European Search Report dated Oct. 17, 2022 received in European Patent Application No. EP 18925489.9.
CATT: "Remaining issues on codebook based UL transmission", 3GPP Draft; RI-1803738, 3rd Generation Partnership Project (3GPP), Mobile Competence Centre ; 650 , Route Des Lucioles ; F-06921 Sophia-Ant ‡polis Cedex; France vol. RAN WG1 , No. Sanya, China; Apr. 16, 2018-Apr. 20, 2018, Apr. 7, 2018 (Apr. 7, 2018), XP051413674.
Ericsson: "PDCCH Enhancements for NR URLLC" ,3GPP Draft; RI-1911945, 3rd Generation Partnership Project (3GPP), Mobile Competence Centre ; 650 , Route Des Lucioles ; F-06921 Sophia-Antipol‡s Cedex; France vol. RAN WG1 , No. Reno , USA; Nov. 18, 2019-Nov. 22, 2019 Nov. 9, 2019 (Nov. 9, 2019), XP051823126.
International Search Report and Written Opinion dated Nov. 17, 2020 in International Application No. PCT/CN2020/075080. English translation attached.
NTT Docomo, Inc., "Summary on URLLC enhanced configured grant transmission", 3GPP TSG RAN WG1 Meeting#99, Nov. 22, 2019 (Nov. 22, 2019), p. 5.
MCC Support. "Final Report of 3GPP TSG RAN WG1 #99 v1.0.0", 3GPP TSG RAN WG1 Meeting #100-e, R1-2000151, Feb. 24, 2020.
MCC Support. "Final Report of 3GPP TSG RAN WG1 #100-e v2.0.0", 3GPP TSG RAN WG1 Meeting #100bis-e, R1-2002747, Apr. 20, 2020.
Communication pursuant to Article 94(3) EPC for European application 20918297.1 mailed Feb. 27, 2023.

\* cited by examiner

INFORMATION DETERMINATION METHOD AND APPARATUS, DEVICE, AND STORAGE MEDIUM

CROSS-REFERENCE TO RELATED APPLICATIONS

The present application is a continuation of International Application No. PCT/CN2020/075080 filed on Feb. 13, 2020, which is hereby incorporated by reference in its entirety.

TECHNICAL FIELD

The present disclosure relates to the field of mobile communications, and in particular, to an information determination method and apparatus, a device, and a storage medium.

BACKGROUND

Currently, a terminal device and a network device need to communicate with each other. In the process of communication, the terminal device needs to communicate with the network device according to an antenna port and a Demodulation Reference Signal (DMRS) port.

In the related art, if the antenna port field is configured as 0bit, and the terminal device uses a default antenna port, and multiple terminal devices use the same DMRS port for data transmission, it will cause the multiple terminal devices to be indistinguishable, and affect the efficiency of data transmission. At present, there is no method to solve the problem of how to determine information of the terminal device to communicate with the network device when no antenna port field exists.

SUMMARY

Embodiments of the present disclosure provide an information determination method and apparatus, a device, and a storage medium, which provide technical solutions for how to determine information of the terminal device to communicate with the network device when no antenna port field exists. The technical solutions are as follows.

In an aspect, an information determination method applied in a terminal device is provided. The method includes: determining, when no antenna port field exists in a format of first Downlink Control Information (DCI), a first Demodulation Reference Signal (DMRS) port used for transmission scheduled by the first DCI, and/or a first antenna port used for transmission scheduled by the first DCI.

In an aspect, a terminal is provided. The terminal includes: a processor, a transceiver connected to the processor, and a memory for storing executable instructions of the processor. The processor is configured to load and execute the executable instructions to perform operations including: determining, when no antenna port field exists in a format of first Downlink Control Information (DCI), a first Demodulation Reference Signal (DMRS) port used for transmission scheduled by the first DCI, and/or a first antenna port used for transmission scheduled by the first DCI.

In an aspect, a network device is provided. The network device includes: a processor, a transceiver connected to the processor, and a memory for storing executable instructions of the processor. The processor is configured to load and execute the executable instructions to perform operations including: transmitting first Downlink Control Information (DCI) to a terminal device. A quantity of bits of an antenna port field included in the first DCI is 0. When the quantity of bits of the antenna port field is 0, it is determined that no antenna port field exists in a format of the first DCI.

BRIEF DESCRIPTION OF DRAWINGS

In order to explain technical solutions in the embodiments of the present disclosure more clearly, drawings used in the description of the embodiments are introduced briefly below. Obviously, the drawings in the following description are only some embodiments of the present disclosure. For those skilled in the art, other drawings can also be obtained from these drawings without creative effort.

DESCRIPTION OF EMBODIMENTS

In order to make objectives, technical solutions and advantages of the present disclosure clearer, the embodiments of the present disclosure will be further described in detail below with reference to the accompanying drawings.

Firstly, briefly introduce the terms involved in the embodiments of the present disclosure.

1. Antenna port: An antenna port can be a physical antenna or a combination of multiple physical antennas. Moreover, no matter whether a channel is formed by a single physical transmit antenna or multiple physical transmit antennas, a reference signal corresponding to the antenna port corresponds to the antenna port, and the terminal device obtains a channel estimation of the antenna port based on the reference signal. The antenna port is an antenna port number used for physical layer signal transmission.

2. DeModulation Reference Signal (DMRS) port: the DMRS port is used to calculate DMRS used for transmission. The DMRS port is a DMRS port number used for calculating, generating, and determining DMRS reference signals in the transmission process.

Figure 1:
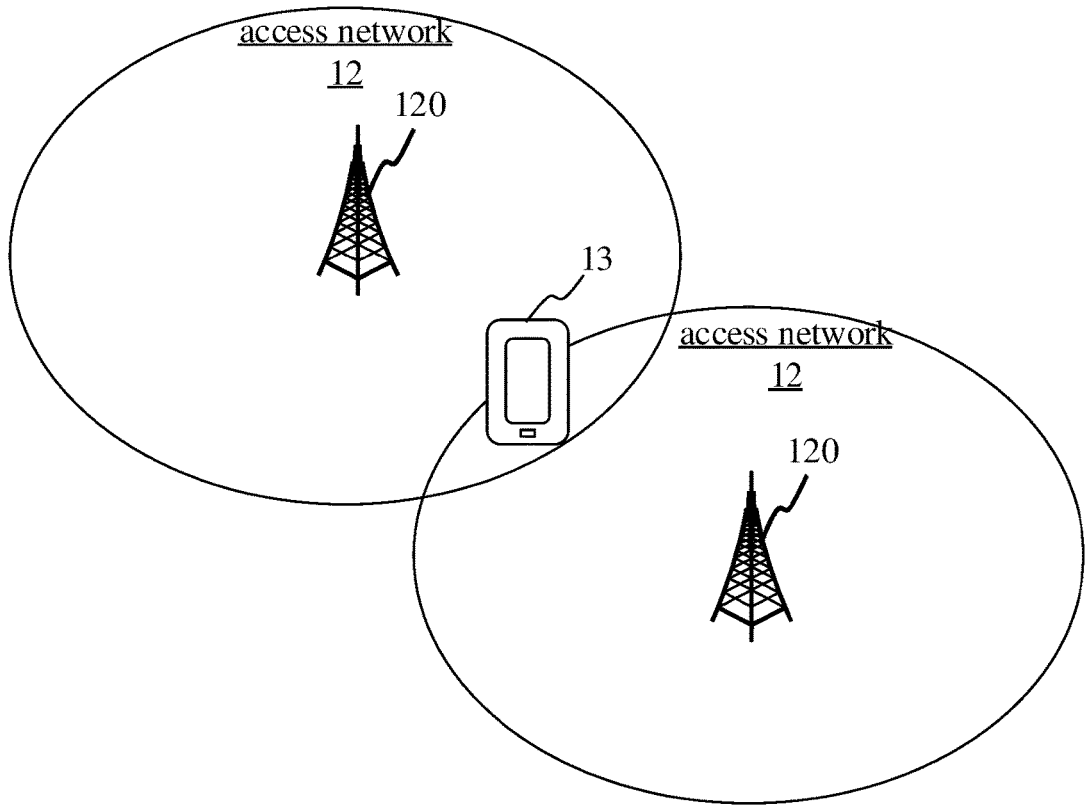
FIG. 1 is a block diagram of a communication system according to an exemplary embodiment of the present disclosure.

FIG. 1 shows a block diagram of a communication system provided by an exemplary embodiment of the present disclosure. The communication system may include an access network 12 and a terminal device 13.

The access network 12 includes several network devices 120. The network device 120 may be a base station, the base station is a device deployed in an access network to provide a terminal device with a wireless communication function. The base station may include various forms of macro base station, micro base station, relay station, access point and so on. In systems using different radio access technologies, names of devices with base station function may vary. For example, in LTE systems, the devices are called eNodeBs or eNBs. In 5th Generation New Radio-Unlicensed (5G NR-U) systems, they are called gNodeBs or gNBs. As communication technology evolves, the description of "base station" may change. For convenience, the above-mentioned devices that provide the terminal device 13 with a wireless communication function are collectively referred to as access network devices in the embodiments of the present disclosure.

The terminal device 13 may include various handheld devices with wireless communication function, vehicle-mounted devices, wearable devices, computing devices or other processing devices connected to the wireless modem, as well as various forms of user equipment, mobile stations (MS), terminal device and so on. The devices mentioned above are collectively referred to as terminal devices for the convenience of description. The access network device 120 and the terminal device 13 communicate with each other by an appropriate air interface technology, such as a Uu interface.

The technical solutions of the embodiments of the present disclosure can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced long term evolution (LTE-A) system, New Radio (NR) system, evolution system of NR system, LTE-based access to unlicensed spectrum (LTE-U) system, NR-U system, Universal Mobile Telecommunication System (UMTS), Worldwide Interoperability for Microwave Access (WiMAX) communication systems, Wireless Local Area Networks (WLAN), Wireless Fidelity (WiFi), next-generation communication systems or other communication systems.

Generally, traditional communication systems support a limited number of connections and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication and Vehicle to everything (V2X) system, etc. The embodiments of the present disclosure can also be applied to these communication systems.

Figure 2:
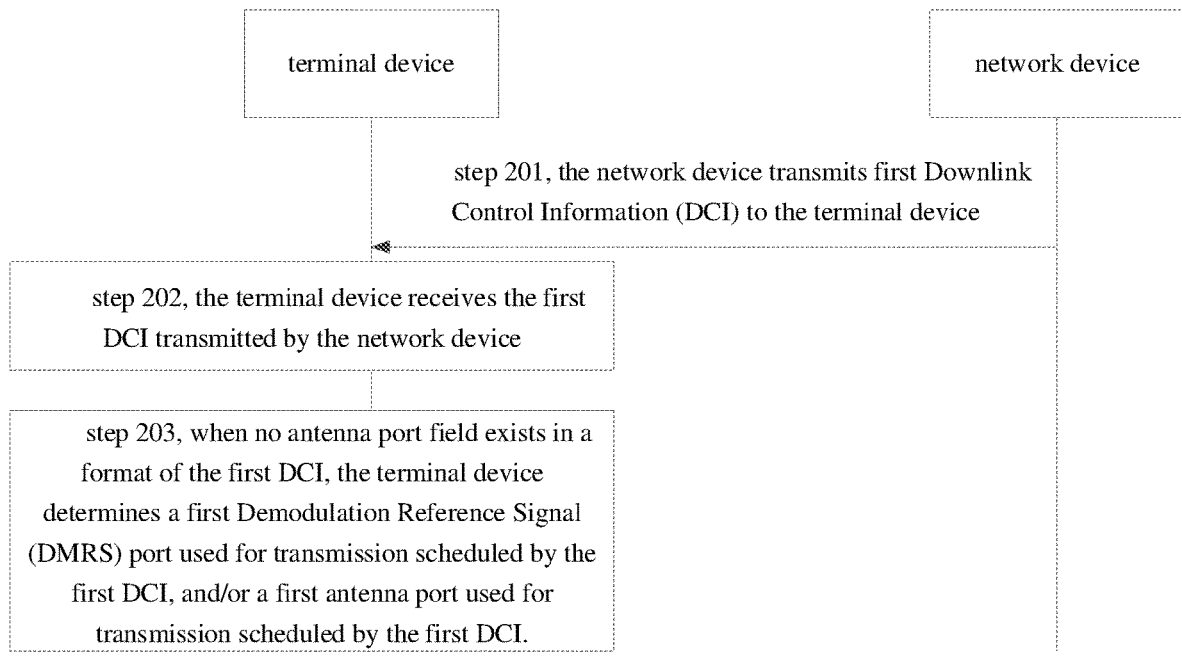
FIG. 2 is a flowchart of an information determination method according to an exemplary embodiment of the present disclosure.

FIG. 2 shows a flowchart of an information determination method provided by an exemplary embodiment of the present disclosure, applied to the terminal device and the network device as shown in FIG. 1. The method includes at least part of the following contents.

At step 201, a network device transmits first Downlink Control Information (DCI) to a terminal device.

At step 202, the terminal device receives the first DCI transmitted by the network device.

The first DCI includes configuration information for the terminal device, and the terminal device may configure based on the first DCI after receiving the configuration information.

The first DCI includes indication information indicating whether an antenna port field exists.

In addition, the network device can configure, for the terminal device, a quantity of bits of the antenna port field included in the first DCI. The quantity of bits in the antenna port field takes at least two values including 0 and a value greater than 0, such as 0, 2, 3, 4, or 5 bits.

When the quantity of bits in the antenna port field is 0, it indicates that no antenna port field exists.

For example, if the first DCI is DCI format 0_2, the information in the first DCI indicates that no antenna port field exists.

At step 203, when no antenna port field exists in a format of the first DCI, the terminal device determines a first Demodulation Reference Signal (DMRS) port used for transmission scheduled by the first DCI, and/or a first antenna port used for transmission scheduled by the first DCI.

When the quantity of bits of the antenna port field included in the first DCI received by the terminal device is 0, the terminal device determines that no antenna port field exists. Then, the terminal device can determine the first DMRS port used for the transmission scheduled by the first DCI, and/or determine the first antenna port used for the transmission scheduled by the first DCI.

The terminal device determining the first DMRS port, and/or determining the first antenna port, includes three cases.

1. The terminal device determines the first DMRS port.
2. The terminal device determines the first antenna port.
3. The terminal device determines the first DMRS port and the first antenna port.

In the embodiments of the present disclosure, the first DMRS port used for transmission scheduled by the first DCI can be understood as the DMRS port used in the process of data transmission scheduled by the first DCI, and the DMRS port is a DMRS port number used for calculating, generating, or determining DMRS reference signals in the transmission process. The first antenna port used for transmission scheduled by the first DCI can be understood as the antenna port used for data transmission scheduled by the first DCI, and the antenna port is an antenna port number used for physical layer signal transmission.

It should be noted that, the present disclosure is only described by taking an example where the network device transmits the first DCI to the terminal device and it is determined that no antenna port field exists based on the first DCI format. In another example, steps 201-202 may not be performed, and the terminal device can determine that no antenna port field exists in other manners.

The embodiments of the present disclosure provide a new method for information determination applied in a terminal device. By determining, when no antenna port field exists in a format of DCI, a first DMRS port used for transmission scheduled by the first DCI, and/or a first antenna port used for transmission scheduled by the first DCI, the terminal device can communicate with the network device based on the determined DMRS port and/or antenna port, thus providing a solution for obtaining the DMRS port and the antenna port, preventing the situation in which the network device cannot distinguish information transmitted by multiple terminal devices, and ensuring the efficiency of communication.

Figure 3:
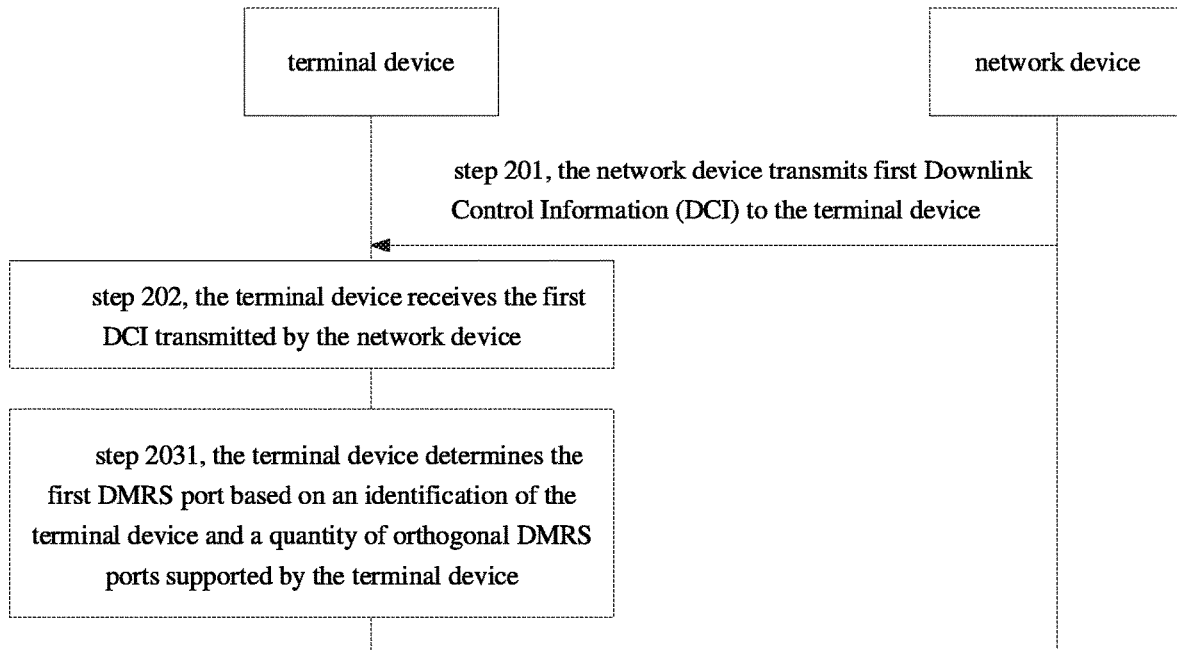
FIG. 3 is another flowchart of an information determination method according to an exemplary embodiment of the present disclosure.

In at least one embodiment based on FIG. 2, FIG. 3 shows a flowchart of an information determination method provided by an exemplary embodiment of the present disclosure. In this embodiment, step 203 can be replaced by step 2031.

At step 2031, the terminal device determines the first DMRS port, based on an identification of the terminal device and a quantity of orthogonal DMRS ports supported by the terminal device.

In the embodiments of the present disclosure, the terminal device determining the first DMRS port based on the identification and the quantity can be understood as the terminal device determining the port number of the first DMRS port based on the identification and the quantity.

The terminal device itself has a unique identification, and then the terminal device can determine the first DMRS port based on its own identification.

Since different terminal devices have different identifications, the first DMRS ports determined by different terminal devices based on the identifications are also different.

The identification of the terminal device may be Cell-Radio Network Temporary Identifier (C-RNTI), Configured Scheduling-RNTI (CS-RNTI), Modulation Coding Scheme Cell RNTI (MCS-C-RNTI), or other identifications.

In addition, the quantities of orthogonal DMRS ports supported by different terminal devices may be different.

The terminal device obtains the quantity of orthogonal DMRS ports supported by the terminal device, and then determines the first DMRS port based on the identification of the terminal device and the quantity. In addition, it also indicates that the first DMRS port is determined based on the identification of the terminal device and the quantity of orthogonal DMRS ports supported by the terminal device.

In a possible implementation, the terminal device obtains a maximum quantity of DMRS ports supported by the terminal device.

The terminal device can determine the first DMRS port, based on the identification of the terminal device and the maximum quantity of DMRS ports supported by the terminal device.

In a possible implementation, the terminal device determines the first DMRS port based on a remainder between the identification and the quantity.

The terminal device performs a modulo operation on the identification and the quantity to obtain the remainder between the identification and the quantity. The remainder is the first DMRS port adopted by the terminal device; that is, the port number of the first DMRS port is determined.

It also indicates that the first DMRS port is determined based on the remainder between the identification of the terminal device and the quantity of orthogonal DMRS ports supported by the terminal device.

For example, the identification obtained by the terminal device is 5, and the obtained quantity is 3. Because the remainder of 5 and 3 is 2, the value 2 is the first DMRS port.

In the method provided by the embodiments of the present disclosure, in the case of no an antenna port field existing, the terminal device can determine the first DMRS port based on the identification of the terminal device and the quantity of orthogonal DMRS ports supported by the terminal device. Since different terminal devices have different identification information, the first DMRS ports determined by different terminal devices are also different, so as to achieve the purpose that different terminal devices use different DMRS ports, thereby ensuring the efficiency of communication.

Figure 4:
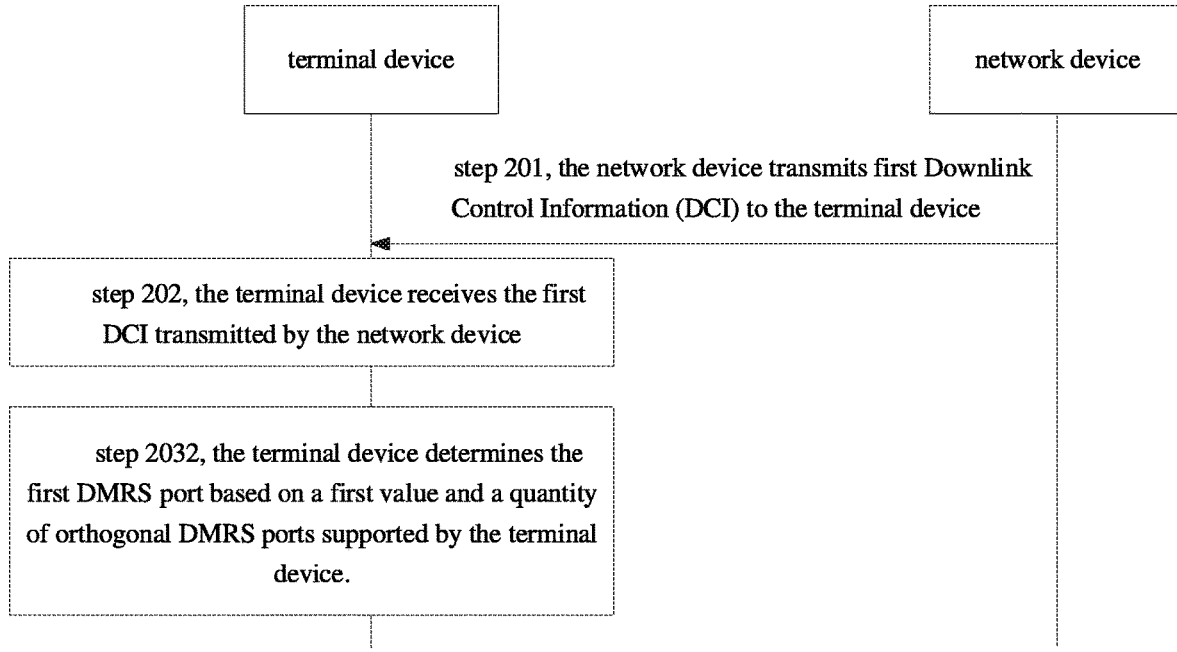
FIG. 4 is another flowchart of an information determination method according to an exemplary embodiment of the present disclosure.

In at least one embodiment based on FIG. 2, FIG. 4 shows a flowchart of an information determination method provided by an exemplary embodiment of the present disclosure. In this embodiment, step 203 can be replaced by step 2032.

At step 2032, the terminal device determines the first DMRS port based on a first value and a quantity of orthogonal DMRS ports supported by the terminal device.

The first DCI is information transmitted by the network device to the terminal device. The first value is a value in a first information field in the first DCI.

The first information field may be any one of Hybrid Automatic Repeat request (HARQ) process number field, time domain resource assignment field, frequency domain resource assignment field and downlink assignment index field.

In addition, the steps for the terminal device to obtain the quantity of orthogonal DMRS ports supported by the terminal device are similar to those of step 2031, which are not repeated here.

Based on the first value and the quantity of orthogonal DMRS ports supported by the terminal device, the terminal device may determine the first DMRS port. In addition, it also indicates that the first DMRS port is determined based on the first value and the quantity of orthogonal DMRS ports supported by the terminal device.

In a possible implementation, the terminal device determines the first DMRS port based on a remainder between the first value and the quantity of DMRS ports supported by the terminal device.

The terminal device performs a modulo operation on the first value and the quantity to obtain the remainder between the first value and the quantity. The remainder is the first DMRS port adopted by the terminal device; that is, the port number of the first DMRS port is determined. In addition, it also indicates that the first DMRS port is determined based on the remainder between the first value and the quantity of orthogonal DMRS ports supported by the terminal device.

For example, the process number of HARQ obtained by the terminal device is 9, and the quantity is 4. Because the remainder of 9 and 4 is 1, the value 1 is the first DMRS port.

According to the method provided by the embodiments of the present disclosure, in the case of no antenna port field existing, the terminal device can determine the first DMRS port based on the first value in the first information field in the first DCI and the quantity of orthogonal DMRS ports supported by the terminal device. Since first DCIs configured for different terminal devices are different and first values configured in the first information fields in different first DCIs are also different, the first DMRS ports determined by the terminal devices based on the first values are also different, so as to achieve the purpose that different terminal devices use different DMRS ports, thereby ensuring the efficiency of communication.

Figure 5:
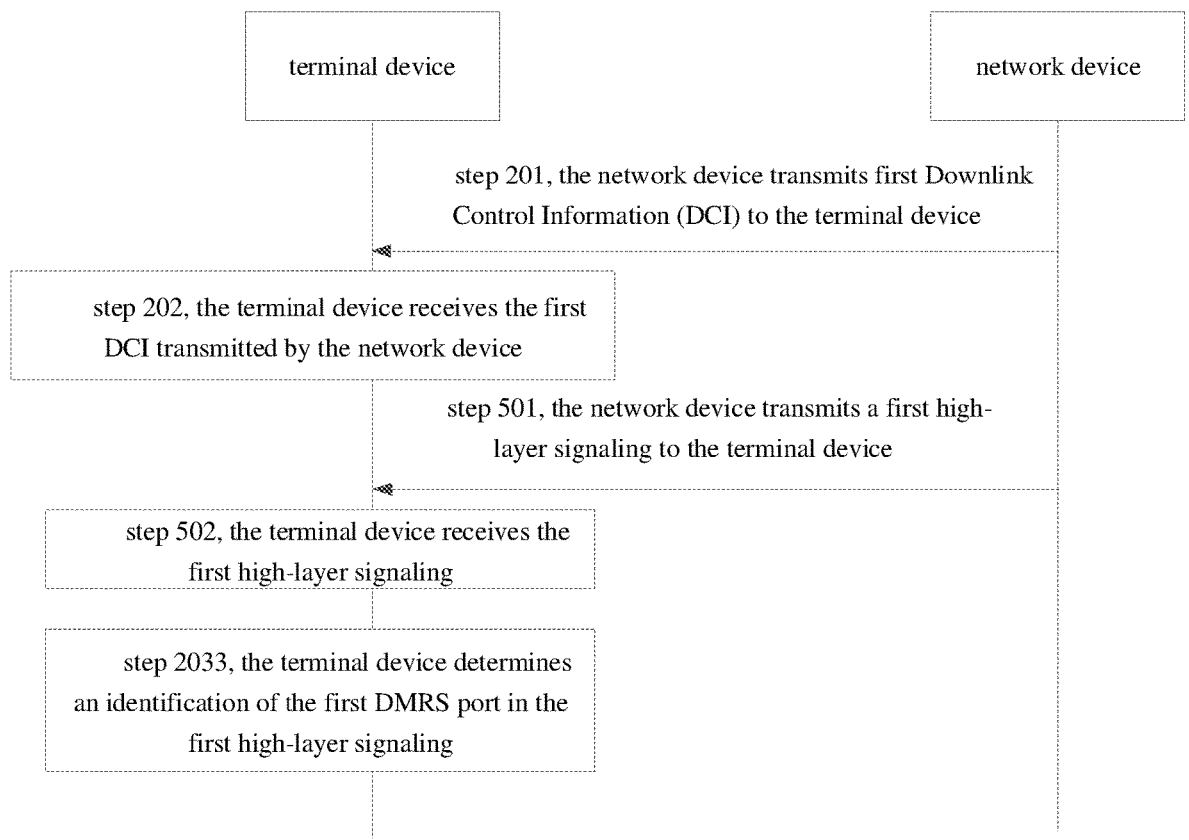
FIG. 5 is another flowchart of an information determination method according to an exemplary embodiment of the present disclosure.

In at least one embodiment based on FIG. 2, FIG. 5 shows a flowchart of an information determination method provided by an exemplary embodiment of the present disclosure. In this embodiment, the information determination method further includes steps 501-502, and step 203 is replaced by step 2033.

At step 501, the network device transmits a first high-layer signaling to the terminal device.

At step 502, the terminal device receives the first high-layer signaling.

At step 2033, the terminal device determines an identification of the first DMRS port in the first high-layer signaling.

The first high-layer signaling includes the identification of the first DMRS port. When receiving the first high-layer signaling transmitted by the network device, the terminal device can obtain the identification of the first DMRS port included in the first high-layer signaling. In addition, the identification of the first DMRS port can be the port number identifying the first DMRS port.

It should be noted that, in FIGS. 3 to 5, the terminal device determines the first DMRS port by itself, or the network device configures the first DMRS port for the terminal device. In another embodiment, when determining that no antenna port field exists, the terminal device determines the identification of the first DMRS port as an identification specified by a protocol. That is, the identification of the first DMRS port is specified by the protocol.

For example, when determining that no antenna port field exists, the terminal device can determine that the identification of the first DMRS port is the value 0 specified by the protocol.

In the method provided by the present disclosure, the terminal device receives the first high-layer signaling including the identification of the first DMRS port, and the terminal device can determine the identification of the first DMRS port from the first high-layer signaling. With the network device configuring the identification of the DMRS port for the terminal device, there is no need for the terminal device to determine the first DMRS port any more, which improves the flexibility of the system.

Figure 6:
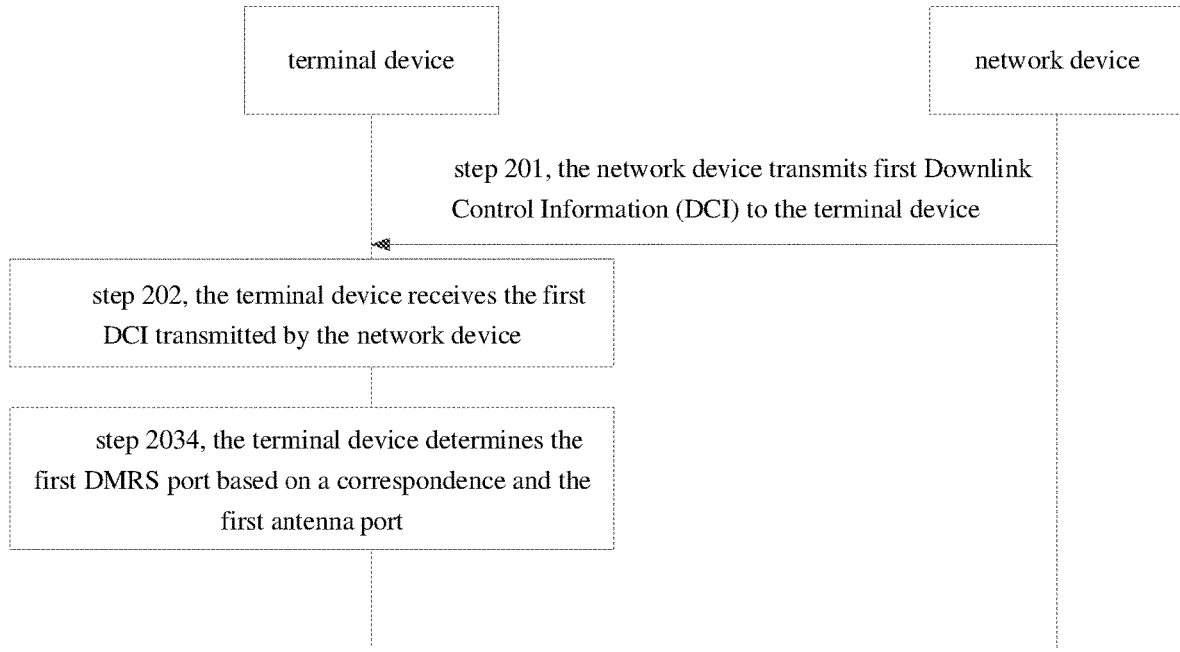
FIG. 6 is another flowchart of an information determination method according to an exemplary embodiment of the present disclosure.

In at least one embodiment based on FIG. 2, FIG. 6 shows a flowchart of an information determination method provided by an exemplary embodiment of the present disclosure. In this embodiment, step 203 is replaced by step 2034.

At step 2034, the terminal device determines the first DMRS port based on a correspondence and the first antenna port.

The correspondence includes a correspondence between antenna ports and DMRS ports. Methods for determining the antenna port will be described in detail in the following embodiments.

The correspondence is a preconfigured correspondence. In addition, the correspondence may be stored in the terminal device, or the correspondence may be stored in a server.

When no antenna port field exists, the terminal device obtains the correspondence, and determines the DMRS port corresponding to the antenna port based on the correspondence. Then the determined DMRS port is the first DMRS port. In addition, it also indicates that the first DMRS port is determined based on the correspondence and the first antenna port.

In a possible implementation, the correspondence is a relationship table, and the relationship table includes the correspondence between antenna ports and DMRS ports.

When no antenna port field exists, the terminal device looks up the relationship table and determines the DMRS port corresponding to the first antenna port in the relationship table as the first DMRS port.

For example, the relationship table between antenna ports and DMRS ports may be as shown in Table 1.

TABLE 1

| Antenna port | DMRS port |
|---|---|
| 0 | 0 |
| 1 | 1 |
| 2 | 2 |
| 3 | 3 |
| 4 | 0 |
| 5 | 1 |
| 6 | 2 |
| 7 | 3 |
| 8 | 4 |
| 9 | 5 |
| 10 | 6 |
| 11 | 7 |

For example, when the antenna port is 4, it can be determined that the first DMRS port is 0 by looking up Table 1.

Figure 7:
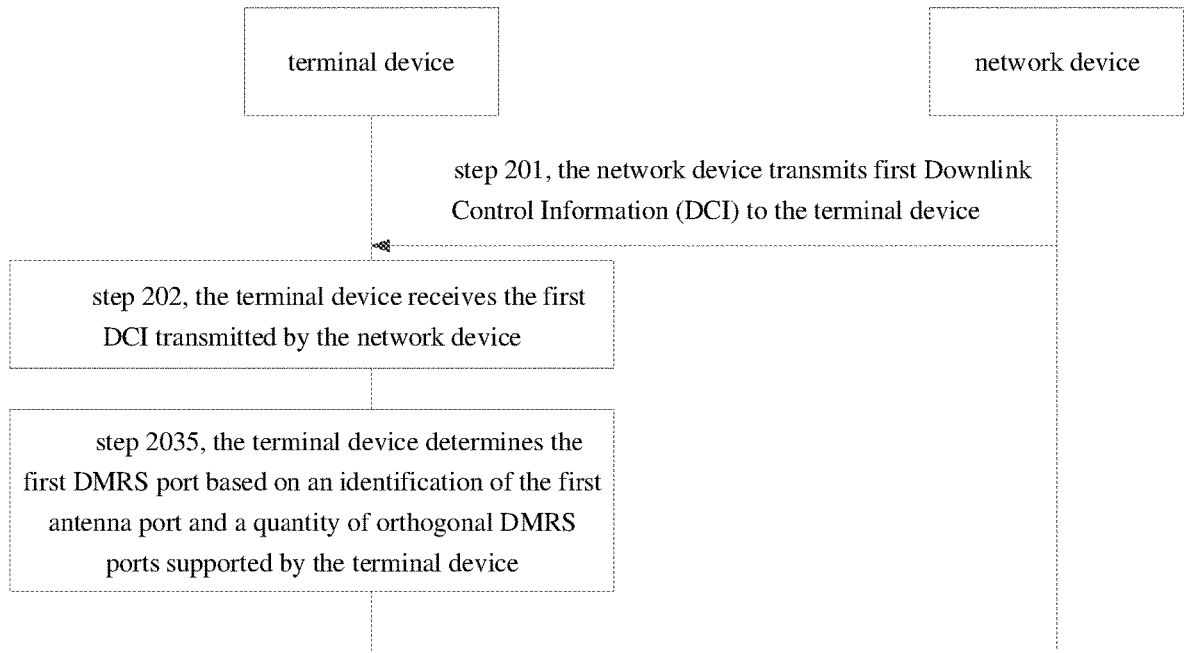
FIG. 7 is another flowchart of an information determination method according to an exemplary embodiment of the present disclosure.

In at least one embodiment based on FIG. 2, FIG. 7 shows a flowchart of an information determination method provided by an exemplary embodiment of the present disclosure. In this embodiment, step 203 is replaced by step 2035.

At step 2035, the terminal device determines the first DMRS port based on an identification of the first antenna port and a quantity of orthogonal DMRS ports supported by the terminal device.

After determining the identification of the first antenna port and the quantity of orthogonal DMRS ports supported by the terminal device, the terminal device can determine the first DMRS port based on the identification of the first antenna port and the quantity of orthogonal DMRS ports supported by the terminal device. In addition, it also indicates that the first DMRS port is determined based on the identification of the first antenna port and the quantity of orthogonal DMRS ports supported by the terminal device.

In a possible implementation, the terminal device determines the first DMRS port based on a remainder between the identification of the first antenna port and the quantity of orthogonal DMRS ports supported by the terminal device.

The terminal device performs a modulo operation on the identification of the first antenna port and the quantity to obtain the remainder between the identification of the first antenna port and the quantity. The remainder is the first DMRS port adopted by the terminal device; that is, the port number of the DMRS port is determined. In addition, it also indicates that the first DMRS port is determined based on the remainder between the identification of the first antenna port and the quantity of orthogonal DMRS ports supported by the terminal device.

For example, the identification of the first antenna port determined by the terminal device is 10, and the quantity of orthogonal DMRS ports supported by the terminal device is 3. Because the remainder of 10 and 3 is 1, the value 1 is the first DMRS port.

The specific method for determining the first antenna port by the terminal device will be described in subsequent embodiments.

It should be noted that, steps of determining the first antenna port by the terminal device are involved in all FIG.

2, FIG. 6, and FIG. 7. In the embodiments of the present disclosure, the method of how to determine the first antenna port will be described.

Figure 8:
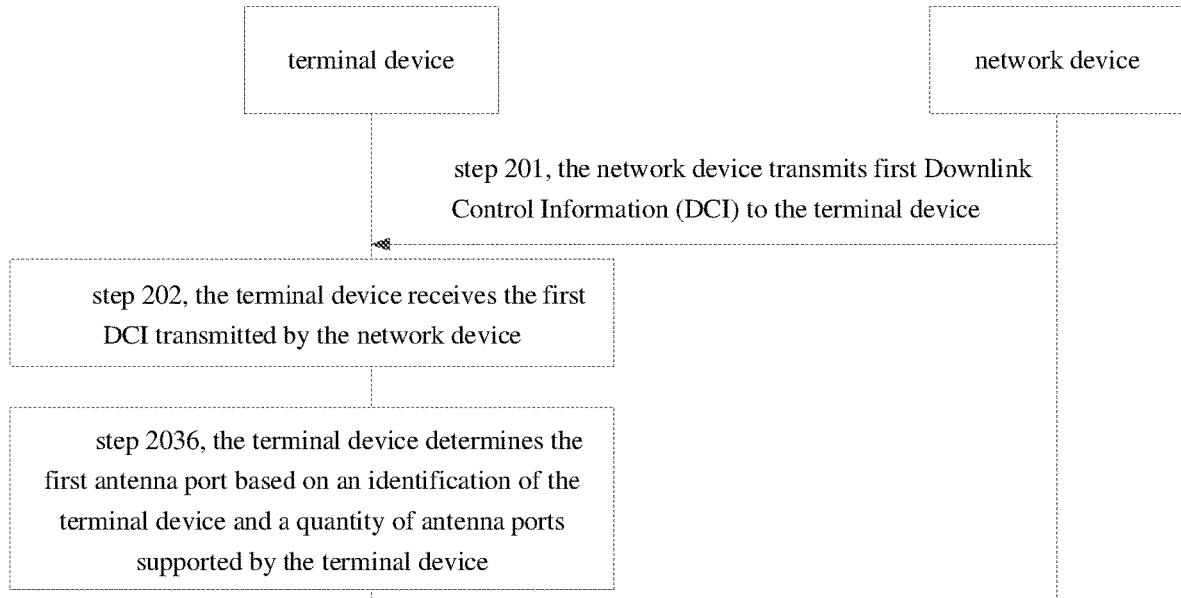
FIG. 8 is another flowchart of an information determination method according to an exemplary embodiment of the present disclosure.

In at least one embodiment based on FIG. 2, FIG. 8 shows a flowchart of an information determination method provided by an exemplary embodiment of the present disclosure. Referring to FIG. 8, step 203 is replaced by step 2036.

At step 2036, the terminal device determines the first antenna port based on an identification of the terminal device and a quantity of antenna ports supported by the terminal device.

Each terminal device supports a fixed quantity of antenna ports, so the terminal device can determine the quantity of antenna ports it supports.

In addition, in the embodiments of the present disclosure the terminal device determining the first antenna port based on the identification and the quantity can be understood as the terminal device determining the port number of the first antenna port based on the identification and the quantity.

In a possible implementation, the terminal device obtains a maximum quantity of antenna ports supported.

The terminal device can determine the first antenna port, based on the identification of the terminal device and the quantity of antenna ports supported by the terminal device. In addition, it also indicates that the first antenna port is determined based on the identification of the terminal device and the quantity of antenna ports supported by the terminal device.

In a possible implementation, the terminal device determines the first antenna port based on a remainder between the identification and the quantity.

The terminal device performs a modulo operation on the identification and the quantity to obtain the remainder between the identification and the quantity. The remainder is the first antenna port adopted by the terminal device; that is, the port number of the first antenna port is determined.

For example, the identification of the terminal device is 5, and the quantity of antenna ports supported by the terminal device is 2. Because the remainder of the value 5 and the value 2 is 1, the value 1 is the first antenna port.

In the method provided by the embodiments of the present disclosure, when no antenna port field exists, the terminal device can determine the first antenna port based on the identification of the terminal device and the quantity of antenna ports supported by the terminal device. Since different terminal devices have different identifications, first antenna ports determined by different terminal devices are also different, so as to achieve the purpose that different terminal devices configure different antenna ports, thereby ensuring the efficiency of communication.

Figure 9:
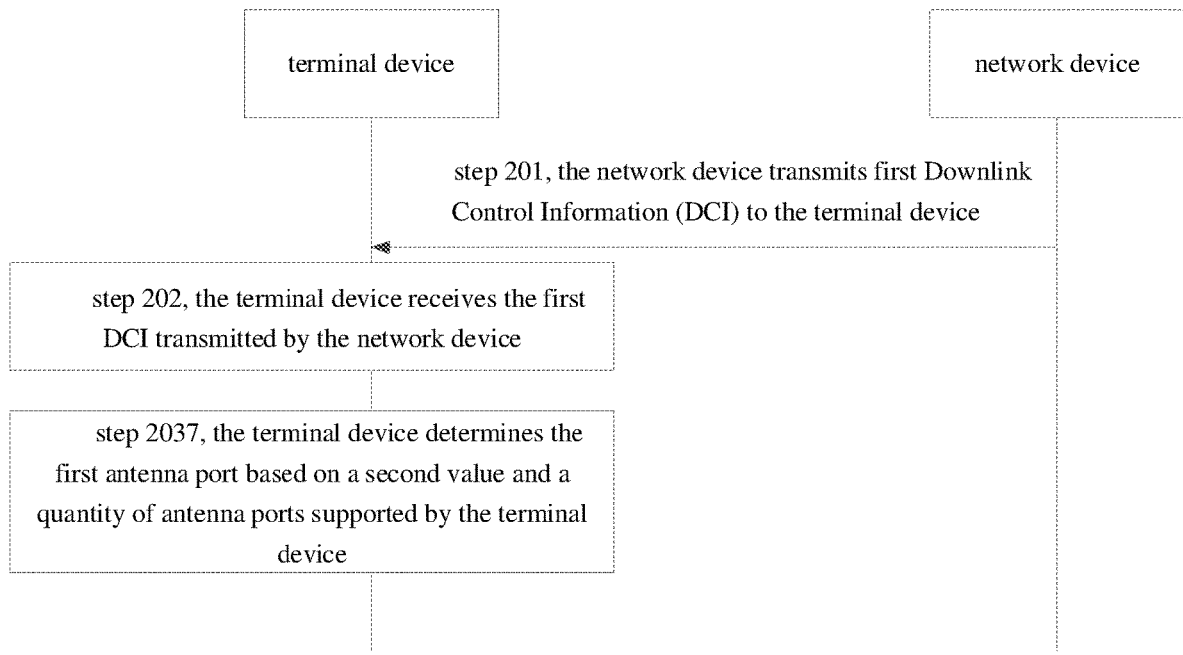
FIG. 9 is another flowchart of an information determination method according to an exemplary embodiment of the present disclosure.

In at least one embodiment based on FIG. 2, FIG. 9 shows a flowchart of an information determination method provided by an exemplary embodiment of the present disclosure. In this embodiment, step 203 can be replaced by step 2037.

At step 2037, the terminal device determines the first antenna port based on a second value and a quantity of antenna ports supported by the terminal device.

The first DCI is information transmitted by the network device to the terminal device, and the second value is a value in a second information field in the first DCI.

The second information field may be any one of Hybrid Automatic Repeat request (HARQ) process number field, time domain resource assignment field, frequency domain resource assignment field and downlink assignment index field.

The terminal device may determine the first antenna port based on the second value and the quantity of the antenna ports supported by the terminal device. In addition, it also indicates that the first antenna port is determined based on the second value and the quantity of antenna ports supported by the terminal device.

In a possible implementation, the first antenna port is determined by the terminal device based on a remainder between the second value and the quantity.

The terminal device performs a modulo operation on the second value and the quantity to obtain the remainder between the second value and the quantity. The remainder is the first antenna port adopted by the terminal device; that is, the port number of the first antenna port is determined.

For example, the process number of HARQ obtained by the terminal device is 11, and the quantity is 3. Because the remainder of 11 and 3 is 2, the value 2 is the first antenna port.

According to the method provided by the embodiments of the present disclosure, when no antenna port field exists, the terminal device can determine the first antenna port based on the second value in the second information field in the first DCI and the quantity of antenna ports supported by the terminal device. Since first DCIs configured for different terminal devices are different and second values configured in the second information fields in different first DCIs are also different, the first antenna ports determined by the terminal devices based on the second values are also different, so as to achieve the purpose that different terminal devices configure different antenna ports, thereby ensuring the efficiency of communication.

Figure 10:
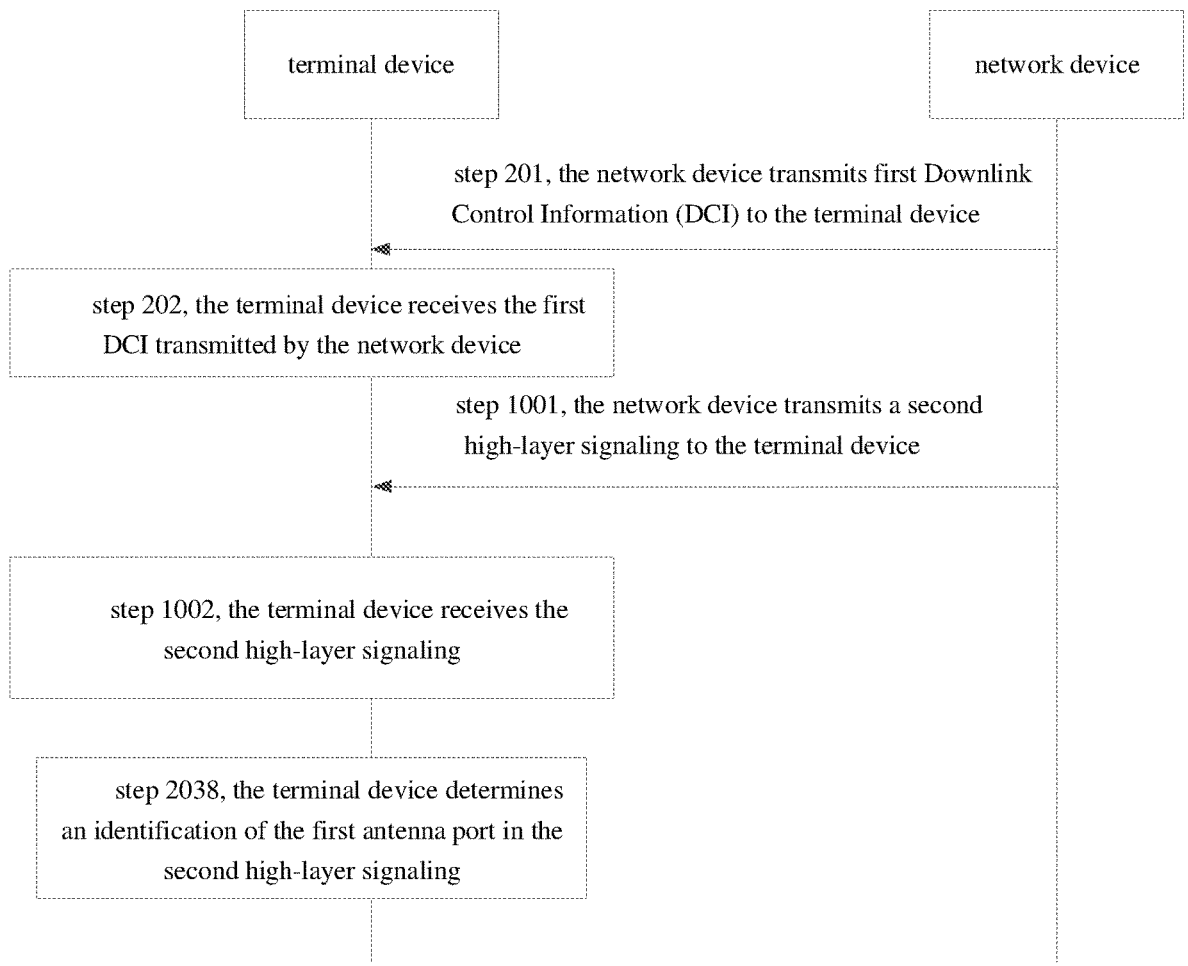
FIG. 10 is another flowchart of an information determination method according to an exemplary embodiment of the present disclosure.

In at least one embodiment based on FIG. 2, FIG. 10 shows a flowchart of an information determination method provided by an exemplary embodiment of the present disclosure. In this embodiment, the information determination method further includes steps 1001-1002, and step 203 is replaced by step 2038.

At step 1001, the network device transmits a second high-layer signaling to the terminal device.

At step 1002, the terminal device receives the second high-layer signaling.

At step 2038, the terminal device determines an identification of the first antenna port in the second high-layer signaling.

The second high-layer signaling includes the identification of the first antenna port. When receiving the second high-layer signaling transmitted by the network device, the terminal device can obtain the identification of the first antenna port included in the second high-layer signaling. In addition, the identification of the first antenna port can be the port number identifying the first antenna port.

It should be noted that, in FIGS. 8 to 10, the terminal device determines the first antenna port by itself, or the network device configures the first antenna port for the terminal device. In another embodiment, when determining that no antenna port field exists, the terminal device determines the identification of the first antenna port as an identification specified by a protocol. That is, the identification of the first antenna port is specified by the protocol.

For example, when the terminal device determines that no antenna port field exists, the terminal device determines that the identification of the first antenna port is the value 0 specified by the protocol.

In the method provided by the present disclosure, the terminal device receives the second high-layer signaling including the identification of the first antenna port, and the terminal device can determine the identification of the first antenna port from the second high-layer signaling. With the network device configuring the identification of the antenna port for the terminal device, there is no need for the terminal device to determine the first antenna port any more, which improves the flexibility of the system.

Figure 11:
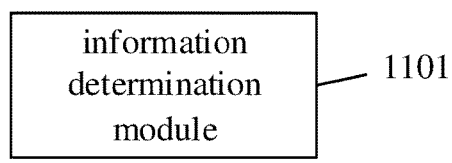
FIG. 11 is a block diagram of a communication apparatus according to an exemplary embodiment of the present disclosure.

FIG. 11 shows a block diagram of a communication apparatus provided by an exemplary embodiment of the present disclosure, applied to the terminal device shown in FIG. 1. The device includes an information determination module 1101.

The information determination module 1101 is configured to determine, when no antenna port field exists in a format of first DCI, a first DMRS port used for transmission scheduled by the first DCI, and/or a first antenna port used for transmission scheduled by the first DCI.

In an example, the first DMRS port is determined based on an identification of the terminal device and a quantity of orthogonal DMRS ports supported by the terminal device.

In an example, the first DMRS port is determined based on a remainder between the identification and the quantity of DMRS ports supported by the terminal device.

In an example, the first DMRS port is determined based on a first value and a quantity of DMRS ports supported by the terminal device, and the first value is a value in a first information field in the first DCI.

In an example, the first DMRS port is determined based on a remainder between the first value and the quantity of DMRS ports supported by the terminal device.

In an example, the first information field includes any one of a hybrid automatic repeat request process number field, a time-domain resource assignment field, a frequency-domain resource assignment field, and a downlink assignment index field.

In an example, the first DMRS port has an identification specified by a protocol.

Figure 12:
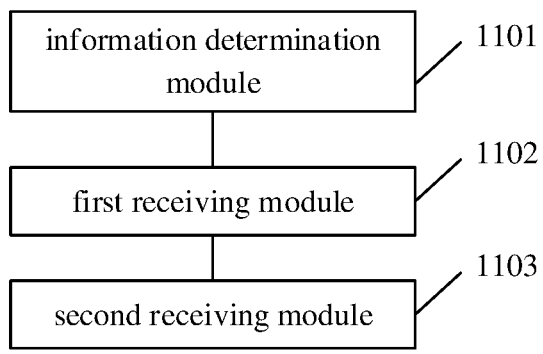
FIG. 12 is another block diagram of a communication apparatus according to an exemplary embodiment of the present disclosure.

In an example, referring to FIG. 12, the apparatus further includes a first receiving module 1102. The first receiving module 1102 is configured to receive a first high-layer signaling including an identification of the first DMRS port.

In an example, the first DMRS port is determined based on a correspondence and the first antenna port, and the correspondence includes a correspondence between antenna ports and DMRS ports.

In an example, the first DMRS port is determined based on an identification of the first antenna port and a quantity of DMRS ports supported by the terminal device.

In an example, the first DMRS port is determined based on a remainder between the identification of the first antenna port and the quantity of DMRS ports supported by the terminal device.

In an example, the first antenna port is determined based on an identification of the terminal device and a quantity of antenna ports supported by the terminal device.

In an example, the first antenna port is determined based on a remainder between the identification of the terminal device and the quantity of antenna ports supported by the terminal device.

In an example, the first antenna port is determined based on a second value and a quantity of antenna ports supported by the terminal device, and the second value is a value in a second information field in the first DCI.

In an example, the second information field includes any one of a hybrid automatic repeat request process number field, a time-domain resource assignment field, a frequency-domain resource assignment field, and a downlink assignment index field.

In an example, the first antenna port is determined based on a remainder between the second value and the quantity of antenna ports supported by the terminal device.

In an example, the first antenna port has an identification specified by a protocol.

In an example, referring to FIG. 12, the apparatus further includes a first receiving module 1102. The first receiving module 1102 is configured to receive a second high-layer signaling including an identification of the first antenna port.

In an example, the apparatus further includes a second receiving module 1103. The second receiving module 1103 is configured to receive the first DCI. A quantity of bits of the antenna port field included in the first DCI is 0. When the quantity of bits of the antenna port field is 0, it is determined that no antenna port field exists in the format of the first DCI.

Figure 13:
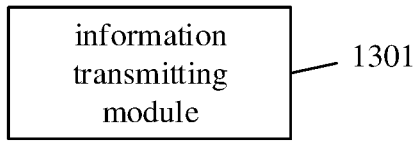
FIG. 13 is another block diagram of a communication apparatus according to an exemplary embodiment of the present disclosure.

FIG. 13 shows a block diagram of a communication apparatus provided by an exemplary embodiment of the present disclosure, applied to the network device shown in FIG. 1. The apparatus includes an information transmitting module 1301.

The information transmitting module 1301 is configured to transmit first DCI to a terminal device. A quantity of bits of an antenna port field included in the first DCI is 0. When the quantity of bits of the antenna port field is 0, it is determined that no antenna port field exists in a format of the first DCI.

In an example, a first information field in the first DCI includes a first value, which is used for the terminal device to determine a first DMRS port or used for the terminal device to determine a first antenna port.

In an example, the first information field includes any one of a hybrid automatic repeat request process number field, a time-domain resource assignment field, a frequency-domain resource assignment field, and a downlink assignment index field.

Figure 14:
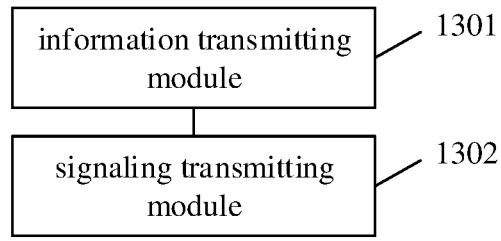
FIG. 14 is another block diagram of a communication apparatus according to an exemplary embodiment of the present disclosure.

In an example, referring to FIG. 14, the apparatus further includes a signaling transmitting module 1302. The signaling transmitting module 1302 is configured to transmit a first high-layer signaling to the terminal device. The first high-layer signaling includes an identification of a first DMRS port.

In an example, referring to FIG. 14, the apparatus further includes a signaling transmitting module 1302. The signaling transmitting module 1302 is configured to transmit a second high-layer signaling to the terminal device. The second high-layer signaling includes an identification of a first antenna port.

Figure 15:
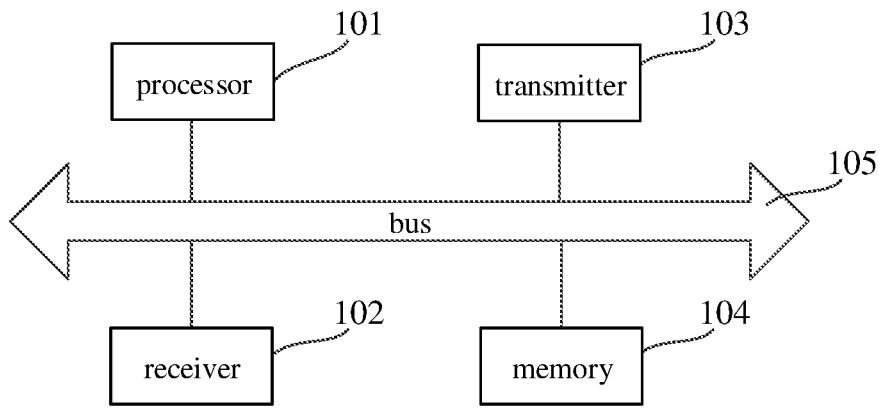
FIG. 15 is a schematic structural diagram of a communication device according to an exemplary embodiment of the present disclosure.

FIG. 15 shows a schematic structural diagram of a communication device provided by an exemplary embodiment of the present disclosure. The communication device (terminal device or network device) includes a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as one communication component, which may be a communication chip.

The memory 104 is connected to the processor 101 by the bus 105.

The memory 104 may be configured to store at least one instruction, and the processor 101 may be configured to execute the at least one instruction to implement various steps in the foregoing method embodiments.

Additionally, the memory 104 may be implemented by any type or combination of volatile or non-volatile storage devices. The volatile or non-volatile storage devices include, but are not limited to, magnetic or optical disks, electrically erasable programmable Read Only Memory (EEPROM), Erasable Programmable Read Only Memory (EPROM), Static Random Access Memory (SRAM), Read Only Memory (ROM), Magnetic Memory, Flash Memory, and Programmable Read Only Memory (PROM).

In an exemplary embodiment, a computer-readable storage medium is also provided. Executable instructions are stored in the readable storage medium, and the executable instructions are loaded and executed by the processor to implement the information determination method performed by the communication device provided by the above-mentioned various method embodiments.

Those of ordinary skill in the art can understand that implementation of all or part of the steps of foregoing embodiments can be completed by hardware, or can be completed by instructing relevant hardware by a program. The program can be stored in a computer-readable storage medium. The storage medium mentioned above may be a read-only memory, a magnetic disk or an optical disk, etc.

The above are only embodiments of the present disclosure, and are not intended to limit the present disclosure. Any modifications, equivalent replacements, improvements, etc. made within the spirit and principles of the present disclosure should be included within the scope of protection of the present disclosure.

What is claimed is:

1. An information determination method, applied in a terminal device, the method comprising:
   determining, when no antenna port field exists in a format of first Downlink Control Information (DCI), a first Demodulation Reference Signal (DMRS) port used for transmission scheduled by the first DCI, and/or a first antenna port used for transmission scheduled by the first DCI,
   wherein the first DMRS port is determined based on an identification of the first antenna port and a quantity of orthogonal DMRS ports supported by the terminal device,
   wherein the first DMRS port is determined based on a remainder between the identification of the first antenna port and the quantity of orthogonal DMRS ports supported by the terminal device.

2. The method according to claim 1, wherein the first DMRS port is determined based on a correspondence and the first antenna port,
   wherein the correspondence comprises a correspondence between antenna ports and DMRS ports.

3. The method according to claim 1, wherein the first antenna port has an identification specified by a protocol.

4. The method according to claim 1, further comprising:
   receiving the first DCI, wherein a quantity of bits of the antenna port field included in the first DCI is 0; and
   determining, when the quantity of bits of the antenna port field is 0, that no antenna port field exists in the format of the first DCI.

5. A terminal, comprising:
   a processor;
   a transceiver connected to the processor;
   a memory for storing executable instructions of the processor,
   wherein the processor is configured to load and execute the executable instructions to implement operations comprising:
   determining, when no antenna port field exists in a format of first Downlink Control Information (DCI), a first Demodulation Reference Signal (DMRS) port used for transmission scheduled by the first DCI, and/or a first antenna port used for transmission scheduled by the first DCI,
   wherein the first DMRS port is determined based on an identification of the first antenna port and a quantity of orthogonal DMRS ports supported by the terminal,
   wherein the first DMRS port is determined based on a remainder between the identification of the first antenna port and the quantity of orthogonal DMRS ports supported by the terminal.

6. The terminal according to claim 5, wherein the first DMRS port is determined based on a correspondence and the first antenna port,
   wherein the correspondence comprises a correspondence between antenna ports and DMRS ports.

7. The terminal according to claim 5, wherein the first antenna port has an identification specified by a protocol.

8. The terminal according to claim 5, wherein the operations further comprise:
   receiving the first DCI, wherein a quantity of bits of the antenna port field included in the first DCI is 0; and
   determining, when the quantity of bits of the antenna port field is 0, that no antenna port field exists in the format of the first DCI.

9. A network device, comprising:
   a processor;
   a transceiver connected to the processor;
   a memory for storing executable instructions of the processor,
   wherein the processor is configured to load and execute the executable instructions to implement operations comprising:
   transmitting first Downlink Control Information (DCI) to a terminal device, wherein a quantity of bits of an antenna port field included in the first DCI is 0,
   wherein when the quantity of bits of the antenna port field is 0, it is determined that no antenna port field exists in a format of the first DCI,
   wherein the first DCI is transmitted to control the terminal device to determine, when no antenna port field exists in the format of the first DCI, a first Demodulation Reference Signal (DMRS) port used for transmission scheduled by the first DCI, and/or a first antenna port used for transmission scheduled by the first DCI,
   wherein the first DMRS port is determined based on an identification of the first antenna port and a quantity of orthogonal DMRS ports supported by the terminal device,
   wherein the first DMRS port is determined based on a remainder between the identification of the first antenna port and the quantity of orthogonal DMRS ports supported by the terminal device.

10. The network device according to claim 9, wherein the first DMRS port is determined based on a correspondence and the first antenna port,
    wherein the correspondence comprises a correspondence between antenna ports and DMRS ports.

11. The network device according to claim 9, wherein the first antenna port has an identification specified by a protocol.

* * * * *